(12) United States Patent
Shirasaka

(10) Patent No.: US 8,803,400 B2
(45) Date of Patent: Aug. 12, 2014

(54) ELECTRIC MOTOR AND MANUFACTURING METHOD OF ELECTRIC MOTOR

(75) Inventor: Hiroshi Shirasaka, Fukushima (JP)

(73) Assignee: Kitashiba Electric Co., Ltd., Fukushima (JP)

( * ) Notice: Subject to any disclaimer, the term of this patent is extended or adjusted under 35 U.S.C. 154(b) by 156 days.

(21) Appl. No.: 13/608,504

(22) Filed: Sep. 10, 2012

(65) Prior Publication Data
US 2014/0070662 A1 Mar. 13, 2014

(51) Int. Cl.
*H02K 13/00* (2006.01)
*H02K 11/02* (2006.01)

(52) U.S. Cl.
CPC .................................... *H02K 11/026* (2013.01)
USPC ............................ 310/239; 310/247; 310/248

(58) Field of Classification Search
CPC ............................. H02K 11/026; H02K 5/145
USPC .................................................. 310/239–248
See application file for complete search history.

(56) References Cited

U.S. PATENT DOCUMENTS

| | | | |
|---|---|---|---|
| 4,342,934 A * | 8/1982 | van Wijhe et al. | 310/239 |
| 4,673,837 A * | 6/1987 | Gingerich et al. | 310/239 |
| 4,783,906 A * | 11/1988 | Gingerich et al. | 29/827 |
| 4,868,442 A * | 9/1989 | Isozumi et al. | 310/239 |
| 5,942,819 A * | 8/1999 | Burgess et al. | 310/51 |
| 6,555,943 B2 * | 4/2003 | Walther et al. | 310/239 |
| 6,849,986 B2 * | 2/2005 | Wong | 310/239 |
| 7,119,473 B2 * | 10/2006 | Simofi-Ilyes et al. | 310/239 |
| 2004/0104639 A1 * | 6/2004 | Wong | 310/239 |

FOREIGN PATENT DOCUMENTS

| | | |
|---|---|---|
| JP | 02-051340 | 2/1999 |
| JP | 2001-238424 | 8/2001 |
| JP | 2003-199282 | 7/2003 |
| JP | 2004-270608 | 9/2004 |
| JP | 2006-296012 | 10/2006 |

* cited by examiner

*Primary Examiner* — Thanh Lam
(74) *Attorney, Agent, or Firm* — Lathrop & Gage LLP; Brian C. Trinque

(57) ABSTRACT

There is provided an electric motor and a manufacturing method of the electric motor capable of joining a brush and a commutator without placing load on components. An electric motor is formed at a side of a brush holder 13 with a second notch unit 32, and a groove unit 36 is formed on a brush 12 so that it overlaps the second notch unit 32 in the position where the brush 12 stored in the brush holder 13 does not abut against a commutator 8. By doing so, when joining the brush 12 and the commutator 8, the brush 12 may be temporarily fixed with respect to the brush holder 13 by pushing in the brush 12 in the brush holder 13 and coinciding the second notch unit 32 and the groove unit 36, and fixing a jig and the like to the groove unit 36 in this state.

3 Claims, 3 Drawing Sheets

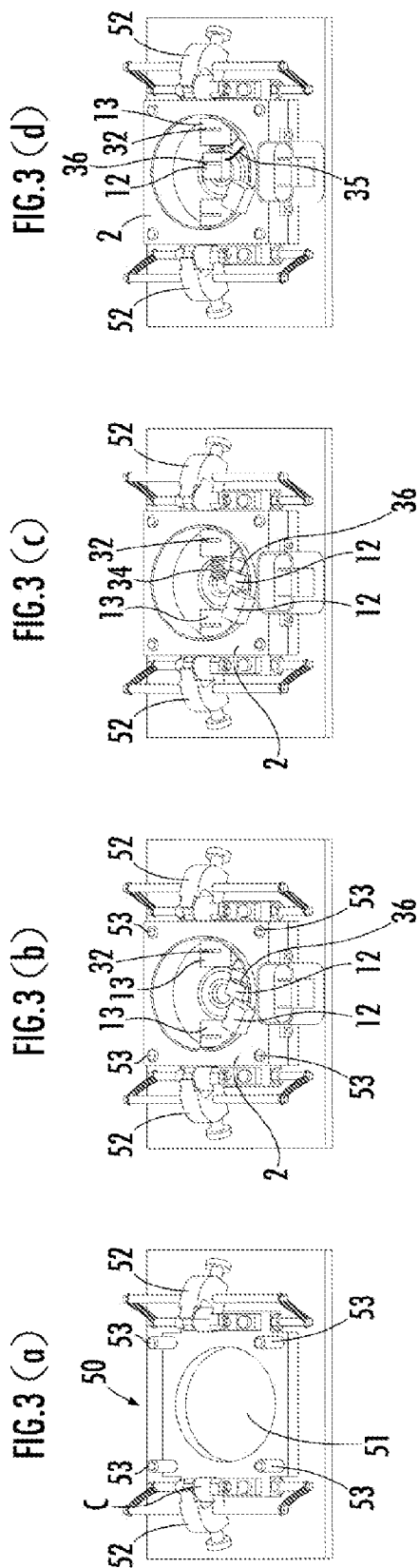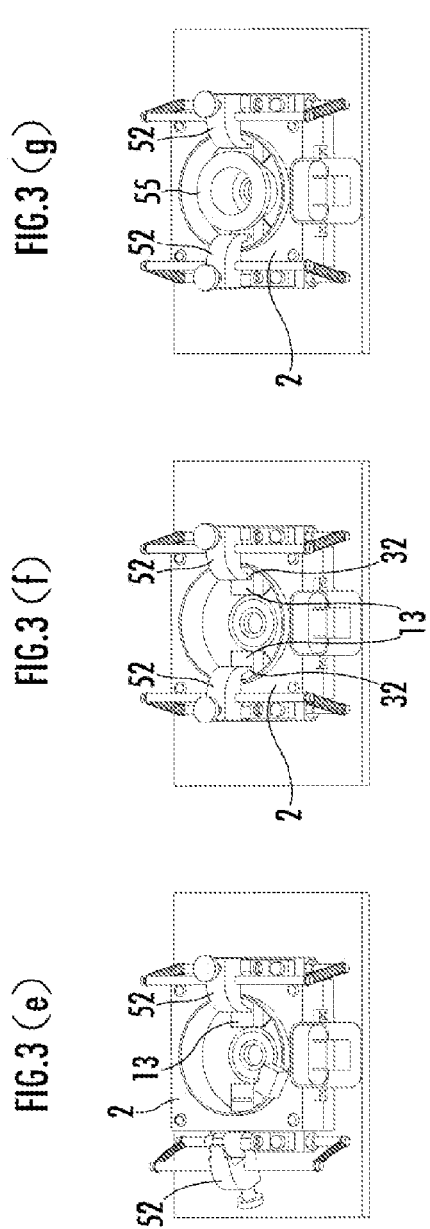

ELECTRIC MOTOR AND MANUFACTURING METHOD OF ELECTRIC MOTOR

BACKGROUND OF THE INVENTION

1. Field of the Invention

The present invention relates to an electric motor which extends an output shaft from a revolution unit provided outside of an engine case to inside the engine case, and a manufacturing method of the electric motor.

2. Description of the Related Art

For example, in a mechanism which changes a valve lift amount of an intake valve provided to each cylinder of a multicylinder engine, it is known to use an electric motor as a driving source of the mechanism, as is shown in Japanese Patent Laid-Open No. 2004-270608 (FIG. 1).

This type of the electric motor is equipped with a bracket fixed to a yoke accommodating a rotor and a commutator, and is fixed to the engine case via the bracket. To the bracket, a bearing which supports the output shaft of the rotor so as to be able to rotate freely, and a brush which contacts the commutator, are supported. To the engine case, a plurality of intake valves and an engine operating unit such as a cam shaft equipped with a cam which presses each valve lifter, and the output shaft of the rotor penetrates the bracket and extends into the inside of the engine case accommodating the engine operating unit.

Specifically, as is shown in Japanese Patent Laid-Open No. 2003-199282 (FIG. 2), such electric motor is equipped with, as a configuration for supplying electricity to a winding wire of the rotor, a commutator provided to an outer periphery of the output shaft, a pair of brushes pressed against the commutator by a spring, a pair of brush holders which slidably supports each brush, and a pigtail wire electrically connected to the brush.

However, in the manufacturing process of such electric motor, upon assembling the bracket equipped with the brush holder and the brush, and the rotor equipped with the commutator, so as to make the brush abut against the commutator, it is necessary to make the brush move away from the commutator side against the biasing force of the spring, by pulling the pigtail wire temporarily, and to insert the commutator between a pair of the brushes. Therefore, there is a fear that the pigtail wire receiving load may disconnect or break, or the connecting portion between the pigtail wire and the brush may disconnect, and the like.

On the other hand, if the pulling force of the pigtail wire is small, there is a fear that when inserting the commutator between the brushes, the brushes may spring to the commutator side by the biasing force of the spring, so that the brushes and the commutator contacts and breaks the commutator.

SUMMARY OF THE INVENTION

In view of the above-mentioned points, it is an object of the present invention to provide an electric motor and a manufacturing method for the electric motor which is capable of joining the brushes and the commutator without placing load on the components.

An electric motor of a first aspect of the invention is an electric motor equipped with a yoke which accommodates a rotor, and a bracket with a rear end coupled to the yoke and a front end coupled to an external surface of an engine case accommodating an engine operation unit, in which an output shaft of the rotor penetrates the bracket and extends into the engine case, comprising: a commutator provided on an outer periphery of the output shaft of the rotor for applying voltage to the rotor; a pair of columnar brushes which abuts against the commutator at one end thereof; a pair of tubular brush holders provided at a rear side of the bracket for storing the brush; and a pair of biasing elements which bias the brush stored in the brush holder to the commutator side; wherein the brush holder, in the state where the bracket is fixed to an assembling tool with an edge-shaped jig descending to a position positioned preliminarily, with the rear side of the bracket being the upper surface, has a slit-shaped notch unit formed at a position corresponding to the position to which the jig descends at the upper side surface of the brush holder, and the brush has a concave groove which is formed so as to overlap the notch unit at a position in which the brush stored in the brush holder does not abut against the commutator, and to which the jig is fitted.

According to the electric motor of the first aspect of the invention, the brush holder and the brush are made so that the notch unit of the brush holder and the concave groove of the brush are overlapped when the brush is moved to a position which does not abut against the commutator. Therefore, when joining the brush and the commutator, it becomes possible to temporarily fix the brush with respect to the brush holder, by pushing the brush into the brush holder and coincides the notch unit and the concave groove, and fitting the jig into the concave groove in this state.

By doing so, there is no need to join the brush and the commutator by pulling the pigtail wire electrically connected to the brush, so that it becomes possible to surely prevent the disconnection and the like of the pigtail wire or the connecting portion of the pigtail wire and the brush.

Further, the brush is surely fixed to the brush holder by the jig fitted to the concave groove, so that when joining the brush and the commutator, the brush does not project out of the brush holder and the brush does not contact with the commutator in an unexpected way, and therefore the brush or the commutator are not broken.

According to the electric motor of the first aspect of the invention, it becomes possible to join the brush and the commutator without placing load on the components.

A manufacturing method of an electric motor of a second aspect of the invention is a manufacturing method of an electric motor equipped with a yoke which accommodates a rotor, a bracket with a rear end coupled to the yoke and a front end coupled to an external surface of an engine case accommodating an engine operation unit, an output shaft of the rotor which penetrates the bracket and extends into the engine case, a commutator provided on an outer periphery of the output shaft for applying voltage to the rotor, a columnar brush which abuts against the commutator at one end thereof, a bottomed tubular brush holder provided at a rear side of the bracket for storing the brush, and a biasing element which biases the brush stored in the brush holder to the commutator side; comprising: a first step of inserting a coil spring as the biasing means to the brush holder provided on the bracket, in the state where the bracket is fixed to an assembly tool with an edge-shaped jig descending to a position positioned preliminarily, with the rear side of the bracket as the upper surface; a second step of coinciding a slit-shaped notch unit formed at the upper side surface of the brush holder corresponding to a position on which the jig descends, with a concave groove formed on a brush stored in the brush holder so as to overlap the notch unit at a position of the brush in which the brush does not abut against the commutator, and to which the jig fits; and a third step of fixing the brush by descending the jig in the state where the notch unit and the concave groove are coincided, and fitting the jig to the concave groove.

According to the manufacturing method of the electric motor of the second aspect of the invention, it becomes possible to push the brush into the brush holder and coincide the notch unit and the concave groove at the second step, and temporarily fix the brush with respect to the brush holder by fitting the jig to the concave groove in the third step.

By doing so, in the manufacturing step, there is no need to join the brush and the commutator by pulling the pigtail wire electrically connected to the brush, so that it becomes possible to surely prevent the disconnection and the like of the pigtail wire or the connecting portion of the pigtail wire and the brush.

Further, the brush is surely fixed to the brush holder by the jig fitted to the concave groove, so that when joining the brush and the commutator, the brush does not project out of the brush holder and the brush does not contact with the commutator in an unexpected way, and therefore the brush or the commutator are not broken.

According to the manufacturing method of the electric motor of the second aspect of the invention, it becomes possible to join the brush and the commutator without placing load on the components.

The manufacturing method of the electric motor of a third aspect of the invention further comprises a fourth step of inserting a tubular cap to one end side of the brush fixed by the jig in the third step.

According to the manufacturing method of the electric motor of the third aspect of the invention, by inserting the tubular cap into one end side of the brush so that the brush temporarily fixed with respect to the brush holder does not project out to the commutator side, it becomes possible to make the bracket equipped with the brush in the state of capable of joining with the commutator as an intermediate assembly.

By joining the intermediate assembly and the rotor equipped with the commutator, and removing the cap, there is no need to join the brush and the commutator by pulling the pigtail wire electrically connected to the brush, so that it becomes possible to surely prevent the disconnection or the like of the pigtail wire and the connecting portion of the pigtail wire and the brush. Further, when joining the brush and the commutator, the brush and the commutator does not contact in an expected way, and therefore the brush or the commutator are not broken.

As such, according to the manufacturing method of the electric motor of the third aspect of the invention, it becomes possible to join the brush and the commutator without placing load on the components.

BRIEF DESCRIPTION OF THE DRAWINGS

FIG. 3 is an explanatory view showing a manufacturing process of the electric motor.

DETAILED DESCRIPTION OF THE PREFERRED EMBODIMENTS

Figure 1:
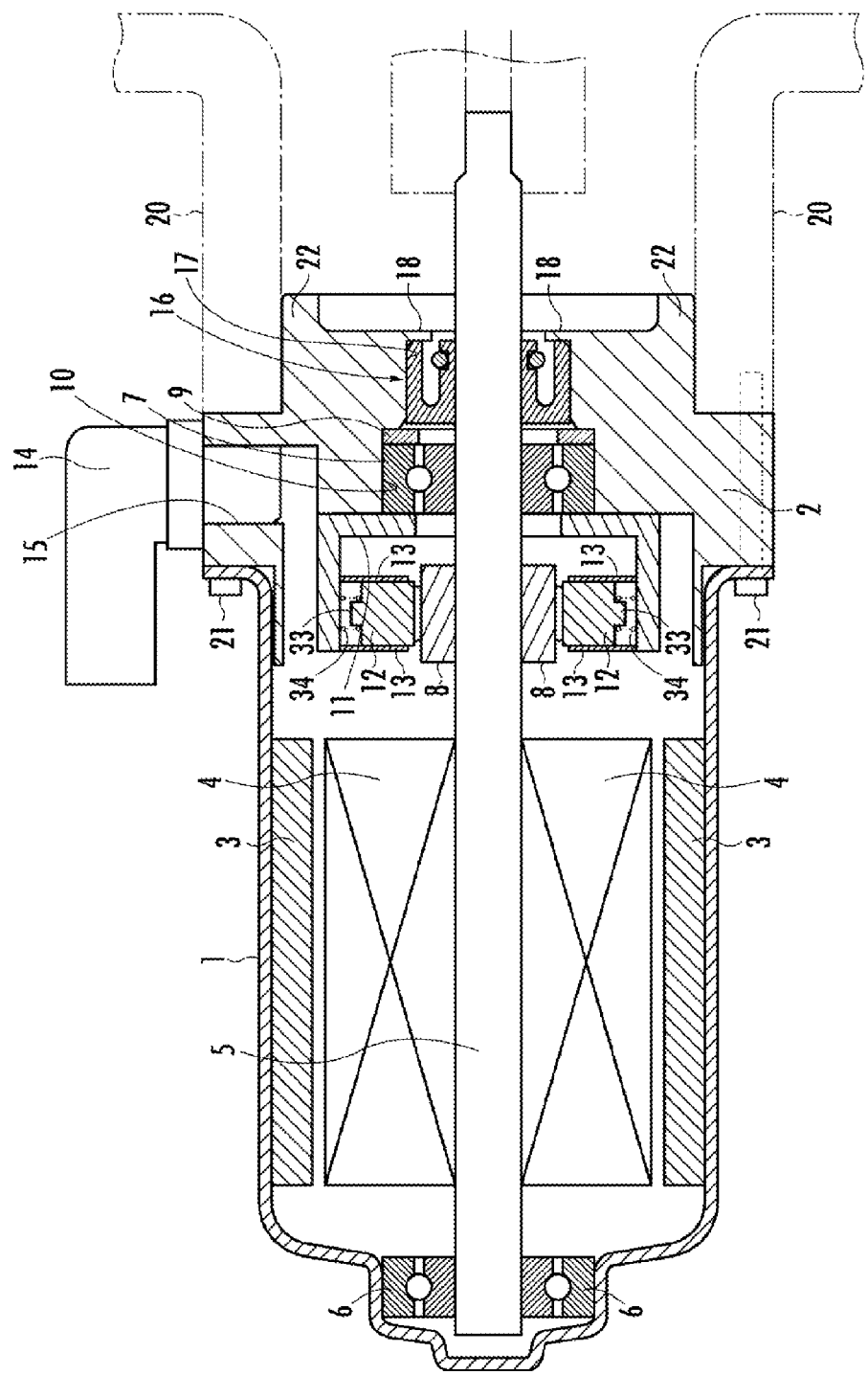
FIG. 1 is a cross-sectional view showing an electric motor of an embodiment of the present invention.

An electric motor of the present embodiment is, as is shown in FIG. 1, equipped with a yoke 1 made of metal, which becomes a tubular case in which a forward end is opened and a rearward end is closed, a bracket 2 which is connected to the opened front portion of the yoke 1, a permanent magnet 3 which is fixed to the inner side of the yoke 1, a rotor 4 (an armature) provided to the inner side of the permanent magnet 3, and an output shaft 5 provided to the rotor 4.

The output shaft 5 is supported so as to be able to rotate freely by a first bearing 6 which is held at the closed rear portion of the yoke 1, and a second bearing 7 (a bearing member) assembled to the bracket 2.

The rotor 4 is equipped with a winding which generates a magnetic force from electric current, and the output shaft 5 is rotary driven by the magnetic force of the permanent magnet 3 acting in the rotational direction of the rotor 4. A commutator 8, which is attached to an outer periphery of the output shaft 5, is electrically connected to the winding of the rotor 4.

The bracket 2 is equipped with a bearing holding unit 10, and a tubular brush holder 13. The bearing holding unit 10 holds, together with a washer 9, the second bearing 7 to which the output shaft 5 is inserted. The brush holder 13 supports a columnar brush 12 via a supporting plate 11, in a position adjacent to the bearing holding unit 10. The brush 12 and the brush holder 13 which supports the same are respectively provided to the position opposing one another across the output shaft 5, and form a pair. The supporting plate 11 is fixed by screwing to the bracket 2 by a screw, not shown.

The brush 12 is electrically connected to the winding of the rotor 4 via the commutator 8, by contacting the commutator 8 during rotation in a bouncing manner. Further, the bracket 2 is formed with a connector mounting unit 15, to which a connector 14 connected to a power source not shown (a controller which supplies a control voltage and the like) is mounted.

Further, the bracket 2 is equipped with a seal holding unit 17 which holds a seal member 16 having an oil-proof property, at a position adjacent to the front side of the bearing holding unit 10, and further, a front side end of the seal holding unit 17 is integrally equipped with a seal abutting unit 18 which protrudes inwardly and to which a front side end of the seal member 16 abut against.

The rear side of the bracket 2 is connected to the yoke 1 so as to constitute the electric motor, and the front side thereof is connected to an engine case 20 which is shown in part in the figure. The yoke 1, the bracket 2, and the engine case 20 are integrally coupled by a plurality of bolts 21.

The bracket 2 is equipped with a tubular unit 22, which protrudes to the inside of the engine case 20, when it is coupled to the engine case 20. The tubular unit 22 encloses the output shaft 5, and a leading end thereof is opened inside the engine case 20. To a leading end of the output shaft 5, which extends into the engine case 20 together with the tubular unit 22 is coupled to an operation shaft and the like of an engine operating unit (a mechanism which changes a valve lift amount of an intake valve provided to each cylinder of a multicylinder engine), not shown, which is provided inside the engine case 20, via a coupling member such as a coupling.

Figure 2:
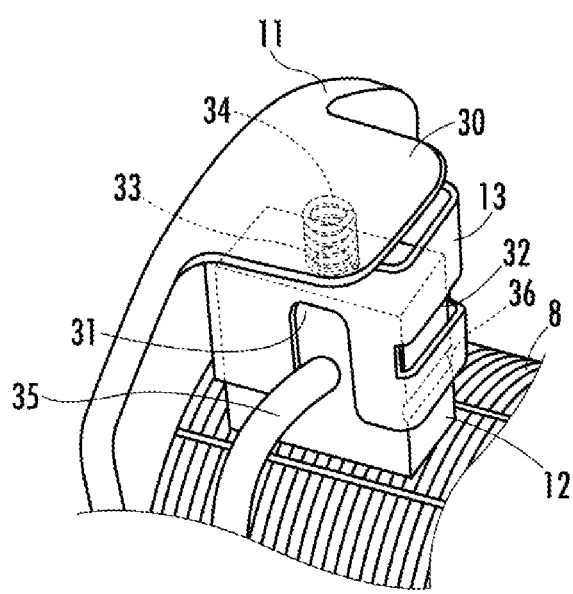
FIG. 2 is an enlarged view of a relevant part of FIG. 1.

Next, with reference to FIG. 2, explanation will be given on the configuration of the brush 12 and the brush holder 13.

First, the brush holder 13 is of a shape of a square tube, and the supporting plate 11 is extended to become a bottom unit 30 of the brush holder 13. Further, the brush holder 13 is formed at one side surface with a first notch unit 31 which is cutout in the direction of the output shaft 5, and a second notch unit 32 (corresponding to a notch unit of the present invention) is formed at another side surface positioned rearward of the bracket 2 which is cutout in a perpendicular direction with respect to the first notch unit 31.

The brush 12 is of a shape of a square column accommodated inside the brush holder 13, and abuts against the commutator 8 at one end side and is inserted inside the brush holder 13 at the other end side. The other end of the brush 12 is convex, and a convex unit 33 is inserted to one end side of a coil spring 34 provided to the bottom unit 30 of the brush holder 13.

Further, the brush 12 is electrically connected with a pigtail wire 35 at one side surface corresponding to the first notch unit 31. By the first notch unit 31 being cutout in the direction of the output shaft 5, even when the brush 12 advances or retreats in the direction of the output shaft 5, the connection between the pigtail wire 35 and the brush 12 does not contact the brush holder 13.

Further, the brush 12 is formed with a groove unit 36 (corresponding to a concave groove of the present invention) at a position overlapping the second notch unit 32, on the other side surface corresponding to the second notch unit 32. The position on which the groove unit 36 is formed is a position where the second notch unit 32 overlaps the groove unit 36, when the brush 12 is in a position which does not abut against the commutator 8. Further, to the groove unit 36, a jig or the like to be explained later is capable of being attached, and by attaching the jig, the brush 12 is capable of being fixed with respect to the brush holder 13.

Next, with reference to FIG. 3, explanation will be given on the manufacturing method of the electric motor of the present embodiment, especially the manufacturing process of mounting components related to the bracket 2.

FIG. 3(a) shows an assembling tool 50 used for the manufacturing of the bracket 2. The assembling tool 50 is equipped with a bracket receiving unit 51 for temporarily fixing the bracket 2, and a pair of edge-shaped jig 52 which turns about a rotational axis C, and which has a leading end fitting with a groove unit 36.

First, as a preparation of the bracket 2, the supporting plate 11 and the brush holder 13 are fixed to the bracket 2, and one end of the pigtail wire is connected to the brush 12 while the other end is connected to the connector 14. Thereafter, the bracket 2 finished with the preparation is, as is shown in FIG. 3(b), fixed to the bracket receiving unit 51 of the assembling tool 50.

At this time, the bracket 2 is fixed by fitting the tubular unit 22 of the bracket 2 to the bracket receiving unit 51, and auxiliary by inserting projections 53 at four corners of the bracket receiving unit 51 to threaded holes that are screwed by bolts 21.

Next, as is shown in FIG. 3(c), the coil spring 34 is inserted towards the bottom unit 30 of the one brush holder 13 (corresponds to a first process of the present invention), and then, as is shown in FIG. 3(d), the brush 12 is inserted into the brush holder 13.

At this time, when inserting the brush 12 to the brush holder 13, first, the side surfaces of the brush 12 and the brush holder 13 are coordinated, so that the connecting portion with the pigtail wire 35 corresponds to the first notch unit 31, and also the groove unit 36 corresponds to the second notch unit 32. Then, after fitting the convex unit 33 of the brush 12 to one end side of the coil spring 34, the brush 12 is gradually inserted into the brush holder 13.

Next, as is shown in FIG. 3(e), in the state where the groove unit 36 and the second notch unit 32 are overlapped so that the groove unit 36 of the brush 12 is visible from the second notch unit 32 of the brush holder 13 (corresponds to a second process of the present invention), the jig 52 is descended to fit with the groove unit 36 (corresponds to a third process of the present invention). By doing so, it becomes possible to temporarily fix one of the brush 12 to the brush holder 13.

Subsequently, similarly to above (refer to FIG. 3(c) through (f)), the other brush 12 is fixed to the brush holder 13 with the jig 52. FIG. 3(f) shows the state where the two brushes 12 are fixed by the jigs 52.

In this state, as is shown in FIG. 3(g), a tubular cap 55 is inserted between the pair of the brushes 12 (corresponds to a fourth process of the present invention). The cap 55 has an outer diameter slightly smaller than a distance between the pair of the brushes 12, and an inner diameter slightly larger than the diameter of the commutator 8 fixed to the outer periphery of the output shaft 5.

Thereafter, by finally removing the jigs fixed to the groove unit 36 of the pair of the brushes 12, respectively, one end of the brush 12 is held in the state of abutting against the outer periphery of the cap 55. The bracket 2 corresponds to an intermediate assembly (sub assy) of the electric motor.

The above is the manufacturing process of the bracket 2. Thereafter, by supplying the bracket 2 to the manufacturing line of the electric motor, inserting the commutator 8 fixed to the outer periphery of the output shaft 5 into the cap 55, and removing the cap 55, the brush 12 and the commutator 8 may be joined.

By doing so, when joining the brush 12 and the commutator 8, it is not necessary to pull the pigtail wire 35. Therefore, it becomes possible to surely prevent the disconnection or the like of the pigtail wire 35 or at the connecting portion of the brush 12 and the pigtail wire 35. Further, when joining the brush 12 and the commutator 8, there is no breakage of the brush 12 or the commutator 8 by the brush 12 and the communicator 8 contacting in an unexpected way. As such, it becomes possible to join the brush 12 and the commutator 8 without placing load on the components.

Further, according to the electric motor of the present embodiment and the manufacturing method thereof, the brush holder 13 has, in the state where the bracket 2 is fixed to the assembling tool 50 so that the edge-shaped jig 52 descends to a position preliminary positioned with the rear end of the bracket 2 being the upper surface, the second notch unit 32 (a notch unit of the present invention) of a slit-shape which is formed on the upper surface of the brush holder 13 corresponding to the position on which the jig 52 descends.

By doing so, the second notch unit 32 of the brush holder 13 and the groove unit 36 (a concave groove of the present invention) of the brush 12 are arranged on the assembling tool 50 so as to be positioned on the upper surface, and also so that the groove unit 36 of the brush 12 accommodated in the brush holder 13 can be observed via the second notch unit 32 of the slit-shape. Therefore, it becomes possible to perform positioning when fitting the jig 52 to the groove unit 36 easily.

Further, the second notch unit 32 of the brush holder 13 is provided at a position on which the jig 52 of the edge-shape descends to the bracket 2 fixed to the assembling tool 50, so that the positioning of the second notch unit 32 and the jig 52 becomes unnecessary.

In addition, the second notch unit 32 of the brush holder 13, the groove unit 36 of the brush 12, and the jig 52 of the edge-shape, are all linearly shaped, so that the operator may intuitively position the linearly-shaped units together. That is, upon positioning, the linearly-shaped groove unit 36 of the brush 12 may be easily found from the second notch unit 32 of the slit-shape (linear-shape). Therefore, the position is easy intuitively, even during the acting of the biasing force of the coil spring 34 as the biasing element. Further, after the positioning of the groove unit 36 is completed, it becomes possible to perform assembling of a complex motor easily, while the operator is performing positioning intuitively, simply by descending the edge-shaped jig 52 of a same linear shape.

In the present embodiment, explanation is given on the case where the bracket 2 as the intermediate assembly of the electric motor is formed by inserting the cap 55 between a pair of the brushes 12, and supplying the same to the assembly line of the electric motor. However, the manufacturing method of the electric motor is not limited thereto, and as shown in FIG. 3(*f*), the commutator 8 and the brush 12 may be joined by inserting the rotor 4 equipped with the commutator 8 at the output shaft 5 between a pair of the brushes 12 in the state where the two brushes 12 are respectively fixed by the jig 52, and by removing the jig 52 thereafter.

Further, in the present embodiment, an explanation in which the groove unit 36 is the concave groove. However, the concave groove is not limited thereto, and may be a circular hole or a hexagonal hole. Further, by making the leading edge of the jig into circular shape or a hexagonal shape in correspondence thereto, the effect of being capable of temporality fixing the brush 12 to the brush holder 13 may be obtained, as is in the present embodiment.

What is claimed is:

1. An electric motor equipped with a yoke which accommodates a rotor, and a bracket with a rear end coupled to the yoke and a front end coupled to an external surface of an engine case accommodating an engine operation unit, in which an output shaft of the rotor penetrates the bracket and extends into the engine case, comprising:

a commutator provided on an outer periphery of the output shaft of the rotor for applying voltage to the rotor;

a pair of columnar brushes which abuts against the commutator at one end thereof;

a pair of tubular brush holders provided at a rear side of the bracket for storing the brush; and a pair of biasing elements which bias the brush stored in the brush holder to the commutator side;

wherein the brush holder, in a state where the bracket is fixed to an assembling tool with an edge-shaped jig descending to a position positioned preliminarily, with a rear side of the bracket being the upper surface, has a slit-shaped notch unit formed at a position corresponding to the position to which the jig descends at an upper side surface of the brush holder, and the brush has a concave groove which is formed so as to overlap the notch unit at a position in which the brush stored in the brush holder does not abut against the commutator, and to which the jig is fitted.

2. A manufacturing method of an electric motor equipped with a yoke which accommodates a rotor, a bracket with a rear end coupled to the yoke and a front end coupled to an external surface of an engine case accommodating an engine operation unit, an output shaft of the rotor which penetrates the bracket and extends into the engine case, a commutator provided on an outer periphery of the output shaft for applying voltage to the rotor, a columnar brush which abuts against the commutator at one end thereof, a bottomed tubular brush holder provided at a rear side of the bracket for storing the brush, and a biasing element which biases the brush stored in the brush holder to the commutator side;

comprising:

a first step of inserting a coil spring as the biasing element to the brush holder provided on the bracket, in a state where the bracket is fixed to an assembly tool with an edge-shaped jig descending to a position positioned preliminarily, with a rear side of the bracket as the upper surface;

a second step of coinciding a slit-shaped notch unit formed at an upper side surface of the brush holder corresponding to a position on which the jig descends, with a concave groove formed on a brush stored in the brush holder so as to overlap the notch unit at a position of the brush in which the brush does not abut against the commutator, and to which the jig fits; and a third step of fixing the brush by descending the jig in a state where the notch unit and the concave groove are coincided, and fitting the jig to the concave groove.

3. The manufacturing method of the electric motor according to claim 2, further comprising a fourth step of inserting a tubular cap to one end side of the brush fixed by the jig in the third step.

\* \* \* \* \*